United States Patent [19]
Anderson et al.

[11] Patent Number: 6,094,643
[45] Date of Patent: Jul. 25, 2000

[54] SYSTEM FOR DETECTING COUNTERFEIT FINANCIAL CARD FRAUD

[75] Inventors: Douglas D. Anderson, Cape May, N.J.; Michael J. Urban, Alexandria, Va.; Eric L. Deterding, Alexandria, Va.; Richard H. Urban, Alexandria, Va.

[73] Assignee: Card Alert Services, Inc., Arlington, Va.

[21] Appl. No.: 09/266,733

[22] Filed: Mar. 12, 1999

Related U.S. Application Data

[63] Continuation-in-part of application No. 08/662,638, Jun. 14, 1996, Pat. No. 5,884,289.
[60] Provisional application No. 60/000,285, Jun. 16, 1995.
[51] Int. Cl.[7] .................................................. G06F 17/60
[52] U.S. Cl. .................. 705/44; 705/1; 705/38; 705/39; 705/41; 705/42; 705/44; 235/379; 235/380; 235/382.5; 379/91.01; 379/93.02
[58] Field of Search .................................. 705/41, 44, 1, 705/35, 38, 39, 42; 235/379, 380, 382.5; 379/91.01, 144, 93.02; 340/825.31

[56] References Cited

U.S. PATENT DOCUMENTS

| | | |
|---|---|---|
| 3,790,754 | 2/1974 | Black et al. . |
| 4,013,894 | 3/1977 | Foote et al. . |
| 4,453,074 | 6/1984 | Weistein ............................... 235/380 |
| 4,628,195 | 12/1986 | Baus . |
| 4,707,592 | 11/1987 | Ware . |
| 4,775,784 | 10/1988 | Stark . |
| 5,162,638 | 11/1992 | Diehl et al. . |
| 5,278,538 | 1/1994 | Ainsworth et al. . |
| 5,311,594 | 5/1994 | Penzias . |
| 5,365,046 | 11/1994 | Haymann . |
| 5,566,234 | 10/1996 | Reed et al. . |
| 5,613,012 | 3/1997 | Hoffman et al. . |
| 5,627,886 | 5/1997 | Bowman . |
| 5,652,421 | 7/1997 | Veeneman et al. . |
| 5,727,163 | 3/1998 | Bezos . |
| 5,781,704 | 7/1998 | Rossmo ........................................ 705/1 |
| 5,819,226 | 10/1998 | Gopinathan et al. .................. 705/1 |
| 5,884,289 | 3/1999 | Anderson et al. ........................ 705/44 |

OTHER PUBLICATIONS

Dialog File 268, Accession No. 00277613, "Integrating systems for new services", Credit Card Management, v8, n9, pS2, Dec. 1995.
Dialog File 647, Accession No. 00569188; Xenakis "Deloitte & Touche Counts on Neural", Informationweek, n 296, 22, Nov. 1990.
Dialog File 636, Accession No. 01825993, "ATM Fraud Usually isn't so High Tech", Bank Network News, Jun. 1992.
Dialog File 9, Accession No. 01179306, "AEA, Barclay Combat Organised Credit Card Fraud" Computergram International, n2652, Apr. 1995.
Dialog File 268, Accession No. 00244274; Peter "Better late than never?", Credit Card Management, v7, n4, p52–54, Jul. 1994.
Ghosh et al. "Credit Card Fraud Detection with a Neural–Network", IEEE 1060–3425/94; pp. 621–630, Mar. 1994.
Dialog File 267, Accession No. 00000559, "Vendor uses Technology to Predict Fraud Credit Risk Management Report", Phillips Business Information, vol. 6, Apr. 1996.

*Primary Examiner*—Eric W. Stamber
*Assistant Examiner*—Romain Jeanty
*Attorney, Agent, or Firm*—Whitham, Curtis & Whitham

[57] ABSTRACT

Counterfeit financial card fraud is detected based on the premise that the fraudulent activity will reflect itself in clustered groups of suspicious transactions. A system for detecting financial card fraud uses a computer database comprising financial card transaction data reported from a plurality of financial institutions. The transactions are scored by assigning weights to individual transactions to identify suspicious transactions. The geographic region where the transactions took place as well as the time of the transactions are recorded. An event building process then identifies cards involved in suspicious transactions in a same geographic region during a common time period to determine clustered groups of suspicious activity suggesting an organized counterfeit card operation which would otherwise be impossible for the individual financial institutions to detect.

14 Claims, 3 Drawing Sheets

SYSTEM FOR DETECTING COUNTERFEIT FINANCIAL CARD FRAUD

CROSS REFERENCE TO RELATED APPLICATIONS

This application is a continuation-in-part and claims priority to U.S. application 08/662,638, filed Jun. 14, 1996, now U.S. Pat. No. 5,884,289, which in turn claims priority to U.S. Provisional application Serial No. 60/000,285, filed Jun. 16, 1995, the complete contents of which are herein incorporated by reference.

BACKGROUND OF THE INVENTION

1. Field of the Invention

The present invention generally relates to identifying credit and debit card fraud and, more particularly, to a computer based system for identifying a relatively few suspect counterfeit card transactions from among the massive number of card transactions which occur on a daily basis.

2. Description of the Related Art

Over the past few decades banks and other financial services organizations have been developing and implementing electronic on-line systems to better serve their retail customers. These systems have involved access devices such as credit cards and debit cards. These cards usually comprise a embossed account number on one side and a magnetic-stripe containing account information in machine readable form on the other side. Debit cards, which deduct funds directly from the user's bank account using an automated teller machine (ATM) or point of sale (POS) terminal, generally require the user to enter a personal identification number (PIN) in order to complete a transaction as a modicum level of security against fraudulent use. Credit cards, on the other hand, do not take money form the user's account, but rather are more akin to a loan from the issuing financial institution to purchase goods and services and, to a lesser extent, obtain cash advances. Credit cards transactions are therefore signature based and generally do not require a PIN number, but simply a signature to complete the transaction. A class of debit cards, known as check cards, now carry the major credit card association and can be used like a credit card in a signature based mode or like a debit card in a PIN based mode at the option of the card holder and the ability of the merchant to handle the transaction. For purposes of this discussion, when credit is used this hybrid card is equated to a signature based card, and when debit is used it is equated to a PIN based card. Since it is in the financial institution's best interest to make using a credit card as carefree as possible, it is generally not required to show a second form of identification when using a credit card. It is thus virtually impossible for a sales clerk to verify the authenticity of a signature or the true identity of the person before them.

The nature of organized, multiple-card debit fraud (PIN based) is markedly different from that of credit card fraud (signature based). Much of this difference stems from the differences in nature between credit card and on-line PINed debit card transactions. The following points identify some of these key differences.

No human interaction is needed to complete on-line debit transactions, unlike the case for credit card transactions. This means that a perpetrator with an "inventory" of counterfeit cards can take a sizable number of cards to a "faceless" ATM (especially during off-hours) and complete many transactions.

Unlike credit cards, debit card transactions require no signature; thus no paper trail exists.

Fraudulent credit card transactions require that the goods purchased be "fenced" in order to give the perpetrator the cash value being sought. Fraudulent debit card transactions can yield cash directly.

Spending with credit cards is limited only by the account's credit limit, while on-line debit cards are limited by a daily withdrawal.

On-line debit transactions have PIN protection, for which there is nothing comparable for credit cards. Once criminals learn how to compromise PIN security, however, PINed debit cards could become more risky than credit cards.

For distribution and economic reasons, FIs share usage credit, ATM and POS terminals used to gain entry to their systems. This shared environment has grown to the point where tens of millions of transactions worth tens of billions dollars flow through it each month. This has translated into a real convenience for FI customers and a business success for the industry. However, as the volume of dollars moved by these services has grown, more attention is being focused on the potential security threats, particularly fraud. Card fraud is increasing, and the potential for more and larger losses is significant. The industry has inadequate technical solutions in place to prevent this fraud and lacks a monitoring system for its early detection and control.

A promising solution has been implemented on a very limited basis in the form of smart card technology which entails placing an electronic chip in the card which is difficult to counterfeit. Smart cards promise multiple-level protocol capabilities for cardholder identification thus having the potential to be more secure than magnetic stripe technology. However, it probably will be at least ten years before smart cards are implemented industry-wide. It will still be necessary to secure the magnetic stripe, therefore, since the two technologies will coexist on the same card during that interim period, the magnetic stripe serving as the primary means to transfer value from a deposit account onto the chip.

Traditional fraud involves one cardholder and one bank issuer. Counterfeit fraud involves an unknown number of banks and an unknown number of their respective cardholders. It is this unknown extent of the counterfeit debit fraud that makes the threat so menacing. Once a scam is discovered, it is often difficult to ascertain whether the problem is a minor one, or a major one.

Using a disease analogy, traditional fraud can be compared to a wound. That is, when the cardholder reports the fraud, the bank has a good reading on its dimension and the necessary treatment. The dimension is the amount reported by the cardholder as missing, and the treatment is to status the card and research the transactions involved. Counterfeit fraud, however, like a disease, is often mis-diagnosed and treated as a wound, which allows it to spread unchecked among other segments of the bank's card base, as well as to those of other institutions, until it is finally uncovered.

Counterfeit card fraud is a two-part crime. In the first part, access to the account is compromised, in the second, funds are stolen or unauthorized merchandise is purchased. The first part leaves no obvious physical trail, but it is the key to determining the dimension of the fraud. The second part of the crime, the theft, separated in time from the first part and resembling traditional fraud, may be misdiagnosed, and hence mistreated, unless information on its incidence is shared and matched with other incidences.

Many financial institutions are currently fairly well able to identify specific instances of card fraud. For example, many FIs employ neural networks which monitor and "learn" an individual customer's spending behavior. Thus, when a card is being used in an unusual manner, such as many large purchases or many purchases at unusual locations, the neural network will flag that particular card for possible fraud and further investigation. Usually, this investigation simply involves a representative of the FI calling or writing to the customer to which the card was issued to verify that the use was authorized. However, while this type of detection is a useful tool to determine isolated incidences of fraud, such as a stolen card, it is ineffective in detecting patterns from among all card transactions indicating the possibility of multiple counterfeit card fraud.

SUMMARY OF THE INVENTION

According to the present invention, counterfeit card fraud is detected based on the premise that the fraudulent activity will reflect itself in clustered groups of suspicious transactions performed with multiple cards. In the parent application from this one depends, possible instances of unreported card fraud was detected by analyzing instances of known card fraud reported by financial institutions. The present invention comprises an improvement on the prior invention by accelerating the detection process by not requiring the financial institutions to wait until known fraud is reported. Rather, the invention starts by using merely suspicious activity gathered from various financial institutions or by analyzing all activity for a particular time period to identify suspicious activity from which a probable multi-institution counterfeit card operation can be detected.

In order to identify the 0.001% of fraud transactions among the 40–60 million signature based transactions that occur daily, the method starts with a small group of the transactions from multiple institutions that appear most suspicious. The initial data is then sifted through a series of filters viewing the data from the issuer, acquirer and then the perpetrator perspective to identify and then confirm multi-institution counterfeit fraud.

There are two methods of acquiring this small subset of the transactions. First for those institutions that run neural nets, submit 3–5% of the highest scoring transactions (most suspicious). Second, for those FI's who can not provide neural net scored transactions, the complete issuer authorization file and pass it through a process of global selection, which reduces the full file to approximately 5% representing the most suspicious transactions. Since this data originates with a number of different organizations which may have different coding schemes, the first step is to edit the data, convert it to a standard set of codes, and format.

These coded and formatted suspicious transactions then become the feeder stock for fraud processing. Scoring rules are applied and historical information is added to compute an overall score that will apply to both the card and individual transactions performed with the card. Since perpetrators typically modify their pattern when someone is on to them, the system includes a feedback loop that allows it to learn and identify new patterns and modify the scoring rules accordingly.

The scored transactions are then distributed into geographical regions based on where they were acquired. Within each region the data is grouped by time and location into smaller units called events. The events are then analyzed and scored based on individual cardholder and transaction scores computed above and the presence of other highly scored transactions in the event and past activity in the event. The scored events are then reviewed to identify and cluster the events based on previous perpetrator patterns. As these patterns are discerned, suspect cards are identified and sent to issuing financial institutions for confirmation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
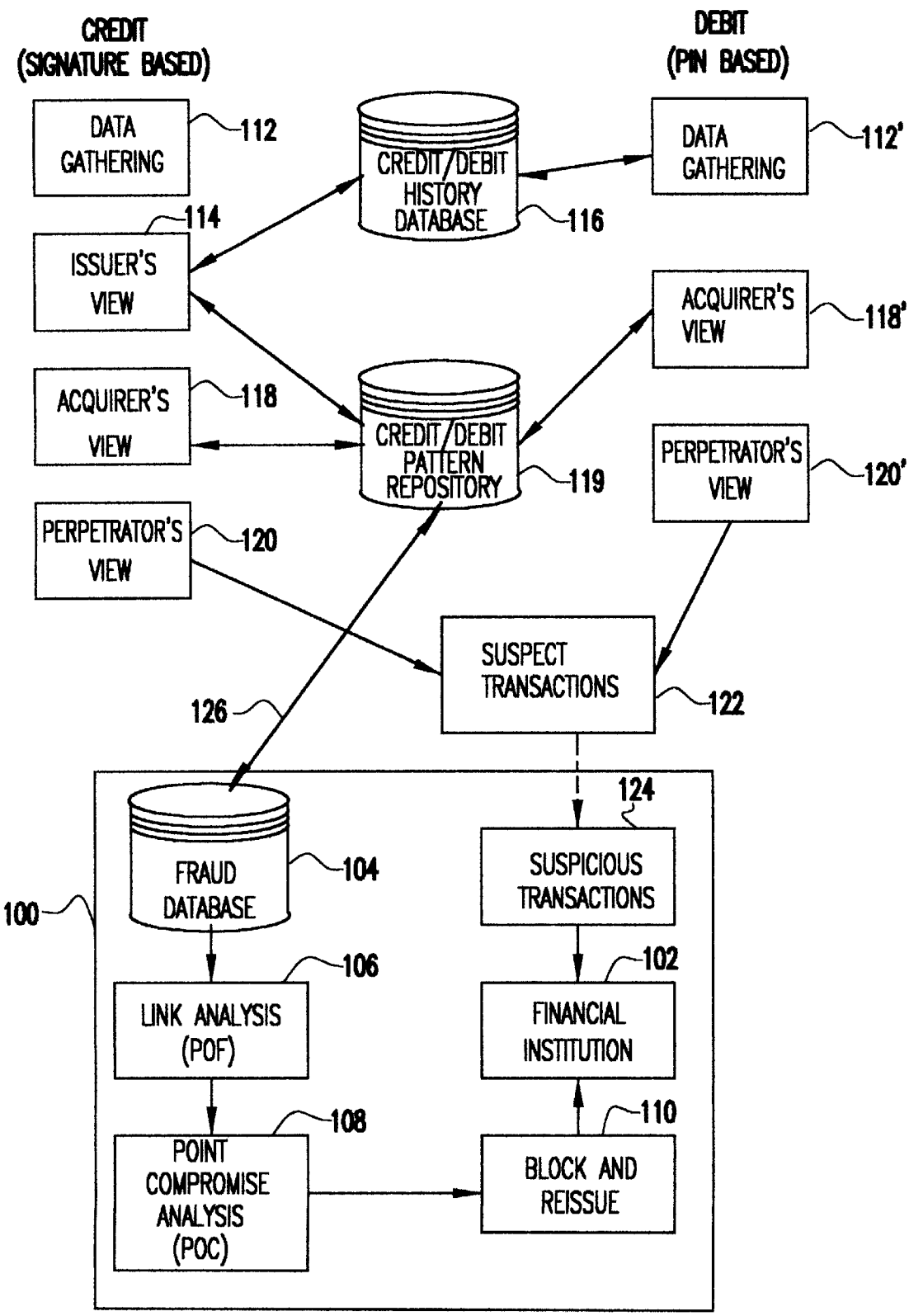
FIG. 1 is a block diagram of the present invention.

The patterns between debit card and credit card fraudulent use is very different. The most significant difference is the daily withdrawal (or purchase) limit associated with debit cards, which forces the perpetrator to "milk" the account over a several day period. Moreover, the card could still be of value to the perpetrator even after the existing balance is depleted. This is true because deposit accounts typically are refreshed periodically with payroll or other deposits. This process, combined with the fact that only 20% of demand deposit account customers regularly reconcile their accounts, affords the criminal the opportunity to defraud single accounts over a period of many days, or even weeks. Based upon these considerations, the following are observed characteristics of counterfeit debit card usage:

Use of the same card over a several consecutive day period, high dollar amount transactions (typically at, or near, the FI's daily withdrawal limit), on the first use of a given card, one or more "daily withdrawal limit exceeded" error transactions immediately preceding a successful transaction (here the perpetrator is "testing" the daily limit for the FI in order to obtain the highest daily amount possible), balance inquiry before a successful high dollar withdrawal (here the criminal is gathering information for not only today's withdrawal, but also for future transactions), a string of consecutive high dollar withdrawal transactions within a period of a few minutes (a typical "session" may involve using five to twenty cards at a single ATM to maximize the "take" and minimize exposure), off-hours use at low-traffic ATMs (10:00 p.m. to 6:00 a.m. is the most prevalent time period; the perpetrator is less likely to encounter other customers at the ATM during this time period and less likely to be observed by passers-by), transactions at 11:30 p.m. to 12:30 a.m. (this is the most popular time period, since it often yields two days' worth of maximum withdrawals for FIs that cut over at midnight), ATMs without cameras (the criminals know, or can find out easily, the ATMs that do not have cameras).

In contrast, the most typical pattern of usage for stolen or counterfeit credit cards is to run the card to its limit as fast as possible (usually within an hour), after which the card is disposed of. This is true because (1) there is typically no daily purchase limit with a credit card, and (2) once the credit limit is reached, the card no longer has any value because the customer is not likely to "refresh" the account (by paying the credit card bill) since the statement will reflect many unauthorized purchases. An organized credit card scam therefore typically involves many counterfeit cards, the originals of which are issued by many different financial institutions, which creates clustered groups of suspicious transactions. However, to the individual financial institutions, the fraud, even if detected, will appear as only an isolated incident and not as a major card compromise because they will be viewing only their part of the cluster.

According to the present invention, the method to detect counterfeit card fraud is based on the premise that the fraudulent activity will reflect itself in clustered groups of suspicious transactions. In order to identify the 0.001% or so of fraud transactions among the 40 to 60 million signature based transactions that occur daily, we must start with a small group of the transactions that appear most suspicious. The following is a discussion of how the initial data is gathered and then sifted through a series of filters viewing the data from the issuer's view, the acquirer's view and then finally the perpetrator's view to identify and then confirm multi-institution counterfeit fraud.

Referring now to FIG. 1, there is shown a block diagram of the present invention. Block 100 is a simplified overview of the system for detecting multi financial card fraud disclosed in the parent application. Financial institutions 102 report known fraudulent transactions which are stored in a fraud database 104. A link analysis 106 is performed on the reported fraud data to determine at least two incidences of reported fraud involving two different financial institution's cards at a particular card machine during a common time period. This suggests that perhaps other incidences of fraud that went unreported may have also taken place at this particular location during that time period. A point of compromise (POC) analysis 108 can then be made on these linked cards to determine other transactions that these cards had in common to determine their common points of use and other cards that may be at risk for fraud. A group of at risk cards can then be flagged for a block reissue 110 which is then reported back to the financial institutions. This system relies on incidences of already reported fraud to begin the analysis. Discovering and reporting fraud of course takes time. That is, by the time a consumer analyzes their statement of account activity and recognizes and reports the fraud to the financial institution, a month or more may have already passed. Therefore, the present invention is designed to accelerate the fraud detection process by not needing to wait for actual fraud to be reported, but rather, the invention starts by gathering merely suspicious activity from various financial institutions or by analyzing all activity for a particular time period to identify suspicious activity from which a probable multi-institution counterfeit card operation can be detected.

As noted above, fraud patterns for credit cards and debit cards are typically different because of the different nature of the cards and how they are used. However, the same general method for detecting fraud is applicable on either type of fraud with slight modifications. For credit cards, data is gathered from various financial institutions at block 112. For those institutions that run neural nets, 3% to 5% of the highest scoring transactions (most suspicious) are requested. Second, for those financial institutions who can not provide neural net scored transactions, a complete issuer authorization file for all raw transactions and gathered. The raw transactions are passed through a global selection process, described in greater detail below, to identify suspicious transactions. The suspicious transactions identified by the neural networks as well as the suspicious transactions identified by the global selection are then analyzed from the issuer's view 114. That is, the cards involved in the suspicious transactions are analyzed to determine other transactions that the individual cards were involved in that day, as well as any historical information 116 recorded in the past, for example, in the last 45 days. At the issuer's view block 114, an overall score is computed which is applied to both the card as well as all of the transactions the card has been involved in. Examples of the scoring rules are given in greater detail below.

Next, in block 118, the scored transactions are viewed from the acquirer's perspective. That is, from the perspective of the merchant's location where the transactions transpired in view of known fraud patterns 119. The scored transactions are categorized by time and geographical region from where they were acquired into smaller groups referred to as events. This can be done by zip code, block code, or any other geographic identifier. The events are then analyzed and scored based on individual card and transaction scores from above as well as based on other transactions in the event. At block 120, the scored events are then analyzed to identify and cluster the events based on previous perpetrator patterns. As the clusters are identified suspect cards 122 are flagged as suspicious 124 and reported to the financial institutions 102 for conformation. These suspect cards are used as the feeder stock for the chain or link analysis 106 to determine related suspicious transactions to again determine the point of compromise 108 and to identify blocks cards which are at risk and should be reissued. Of course as new fraud patterns are detected 126, this information can used to modify and refine the various scoring criteria.

Debit cards are processed in much the same way as credit cards described above, transaction data is gathered from a plurality of financial institutions 112' and scored to determine the most suspicious transactions. The scored transactions are categorized by time and geographical region from where they were acquired into smaller groups referred to as events. Typically, these events can comprise a single ATM machine or a group of ATM machines within a geographical region. The events are then analyzed and scored based on individual card and transaction scores from above as well as based on other transactions in the event. At block 120', the scored events are then analyzed to identify and cluster the events based on previous perpetrator patterns and the cards involved are flagged as suspects 122 for further processing as explained above.

Below, details given for the data gathering step 112, issuer's view 114, acquirer's view 118 and perpetrator's view 120, as discussed above, and examples are given for various scoring criteria and fraud patterns. Of course the scoring and fraud patterns are subject to be refined as criminal fraud patterns evolve over time.

Figure 2:
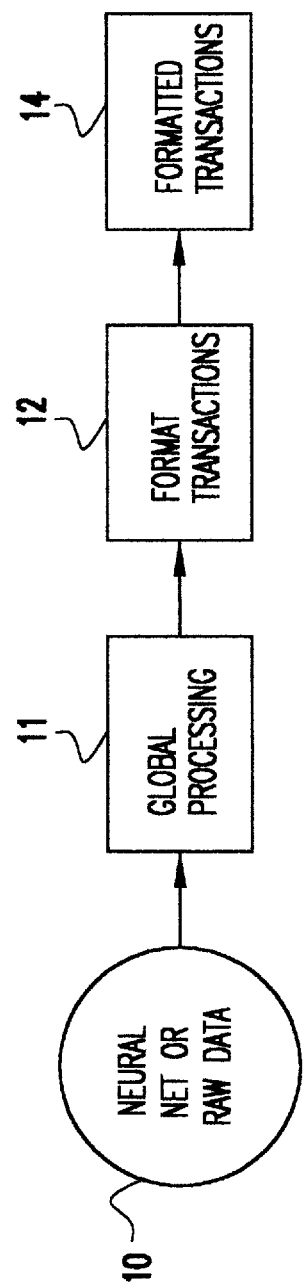
FIG. 2 is a flow diagram showing the data routine for gathering raw transaction data and neural network data.

Referring to FIG. 2, at block 10, there are two methods of acquiring suspicious transactions from among the many financial institutions (FIs). First for those institutions that run neural nets, 3% to 5% of the highest scoring transactions (most suspicious) are requested.

Second, for those financial institutions who cannot provide neural net scored transactions, a complete issuer authorization file for all raw transactions are gathered and passed through a global selection process 11. The global selection process reduces the raw transaction data down to about 5% of the most suspicious cards based on the card usage of that day. The following are examples of the types of criteria:

1. A card has 3 or more successful transactions
2. A card has 3 or more denied transactions (not for the same transaction)

3. A card has at least one transaction for $200 or more.

Thereafter, the data are passed though a transaction format program 12 which normalizes the data since the neural net scoring fields can be very dissimilar between various institutions. Neural nets tend to score transactions from 0 to 999 for fraud tendency; some systems consider 100 highly fraud others 900. Thus, since this data originates with a number of different financial institutions which may have different coding schemes, the first step is to edit the data, convert it to a standard format and store it at block 14 for further precessing. This process "cleanses" the files and formats the fields to standardized field types and data values. Examples include transaction type fields, error codes and neural net scoring fields.

Figure 3:
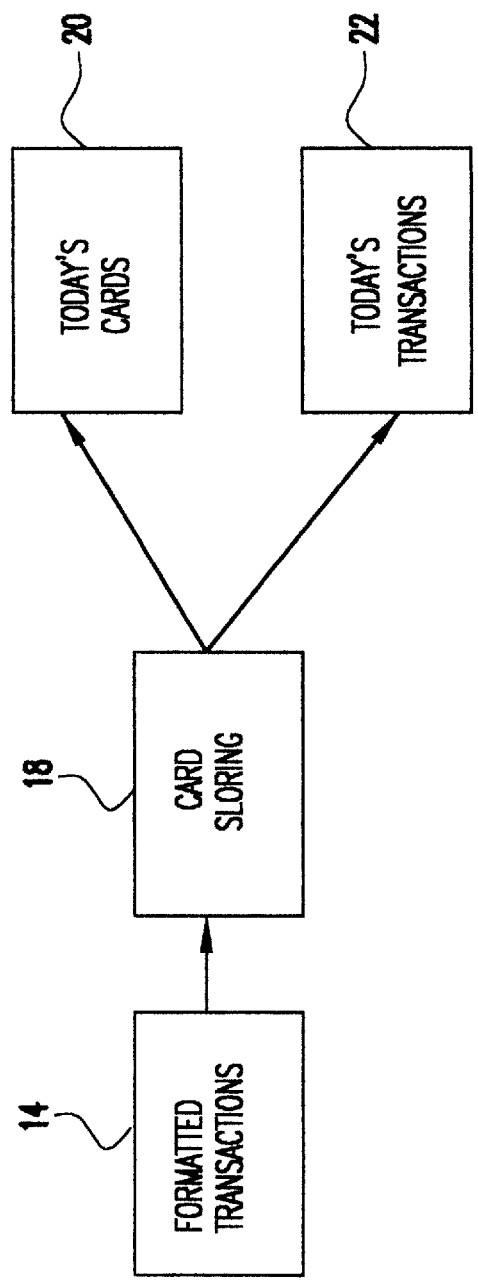
FIG. 3 is a flow diagram showing the routine for card scoring from the issuer's view.

Referring to FIG. 3, there is shown a flow diagram illustrating the steps for card and transaction scoring based in the issuer's view. That is, logic necessary to determine a card/transaction score based on transaction activity and any historical information available. First at block 18, a card scoring applette determines a score for the transactions associated with each card. Scoring is based on a variety of factors. A weighting table gives a value to each card and transaction characteristic marked during evaluation. The sum of the weights is the score for the transaction. Factors for determining weighting may comprise the following:

A. Transactions at high fraud merchants. Some current SIC codes (standard industrial codes) that criminals target include Gas Stations (5541), Electronics stores (5731, 5064, 5722F) and Jewelry stores (5094H, 5944A, 5944, 5094, 5094F).

B. Card Status. This is an internal status that applies to cards that have been previously reviewed and categorized as:
  1. POS Suspect
  2. POS Normal Activity
  3. POS Counterfeit
  4. POS Lost Stolen C. Foreign Use: The Issuer's geographic region is different than the terminal's geographic region.

D. Card History Characteristics, these are velocity characteristics and include:
  1. The number of times the card has been used in the last five days
  2. Number of days the card has been used in the last 5 days
  3. Number of pair-or-more events the card appeared in the last 5 days
  4. Amount of authorized usage in the last 5 days The Scoring process "scores" all cards and transactions based on standardized Scoring Parameters. These scores are based upon characteristics that the cards and transactions contain; they are carried with the card or transaction permanently. The Scoring Parameters are shown below. Some sample weights are given for illustration purposes only and of course may be adjusted as more is learned by empirical observations.

TABLE 1

| | Per Card Information | Type | Weight |
|---|---|---|---|
| 1 | Fraud | Status | 50 |
| 2 | Customer Complete | Status | 10 |
| 3 | Hard Suspect | Velocity | 70 |
| 4 | Number of Zip codes card appeared in today | Velocity | |
| 5 | More than 5 successful transactions | Velocity | |
| 6 | More than 5 denied transactions | Velocity | |

TABLE 1-continued

| | Per Card Information | Type | Weight |
|---|---|---|---|
| 7 | More than 2 successful transactions > $200 | Velocity | |
| 8 | At least 1 successful transaction for > $1000 < $2000 (for these SIC codes) | Velocity | |
| 9 | At least 1 successful transaction for > $2000 (for these SIC codes) | Velocity | |
| 10 | More than 2 successful transactions totaling more than $500 | Velocity | |
| 11 | More than 1 successful transaction at the same terminal ID (pre-authorizations?) | Location | |
| 12 | At least 1 successful gasoline purchase | Location | |
| 13 | At least 1 successful purchase at jewelry, electronic or department store SIC. | Location | |
| 14 | Number of days card appears in the POS 5-day table | History | |
| 15 | Total number of successful transactions in the history table | History | |
| 16 | Total number of successful transactions for > $200 in the POS 5-day table | History | |
| 17 | Total dollar amount of successful transactions made by this card in the POS 5-day table | History | |
| 18 | Did this card use the same location in the past 5 days | History | |

Individual Transaction Info:

| | | | |
|---|---|---|---|
| 1 | Transaction denied | | |
| 2 | Successful gasoline purchase | | |
| 3 | Successful jewelry, electronic, or department store purchase | | |
| 4 | Transaction performed at an exception location (use this to identify locations that for one reason or another we should ignore when looking for fraud) | | |
| 5 | Dollar amount between 0 and 200 | | |
| 6 | Dollar amount between 201 and 500 | | |
| 7 | Dollar amount between 501 and 1000 | | |
| 8 | Dollar amount >1000 | | |

Based on the above factors, each card and its score are stored as "today's cards" at block 20 and each transaction and its score is placed in "today's transactions" at block 22.

Figure 4:
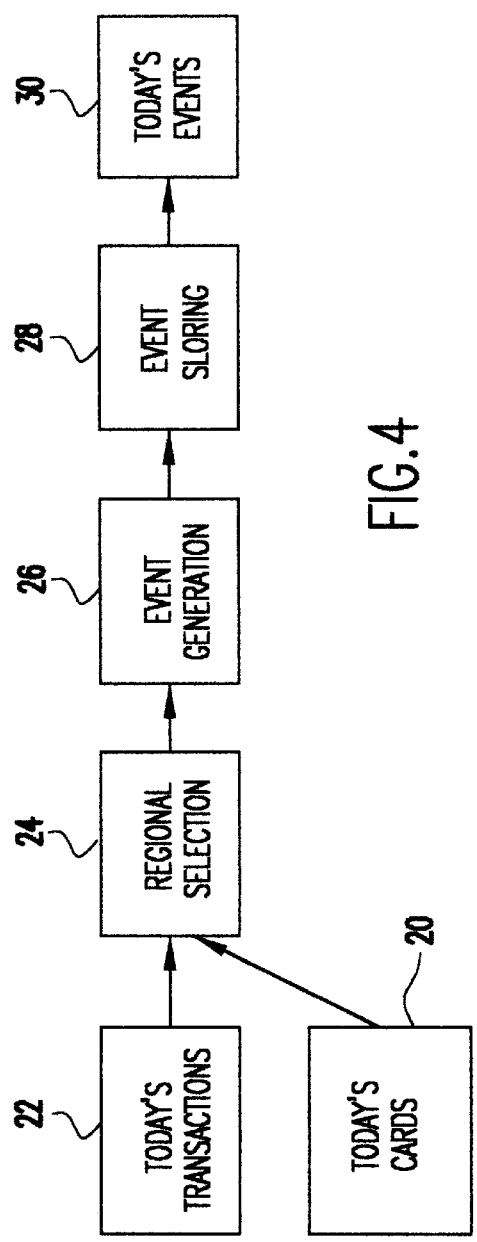
FIG. 4 is a flow diagram showing the routine for event building from the acquirer's view.

Referring now to FIG. 4, there is shown a flow diagram showing event building according to the present invention from the acquirer's view. That is, from the view of those entities such as the merchants accepting the cards and processing the transactions. The scored transactions are categorized by time and geographical region from where they were acquired into smaller groups referred to as events. This can be done by zip code, block code, or any other geographic identifier. The events are then analyzed and scored based on individual card and transaction scored from above as well as based on other transactions in the event. In block 24, regions are selected via the zip codes or other international geographic identifier for the transactions to be analyzed for a particular day. Any day may be selected and reprocessed at a later point if desired. At block 26, the transactions for the selected day and the selected region are processed to generate events based on discrete time intervals. The default event will comprise transactions in the same geographic region during a sixty minute period. Workflow tables are updated with processing steps and status. The transactions selected for events are then passed to the event scoring block 28 from the acquirer's view.

Event scoring parameters may include transactions performed in the same geographic region (GEO-codes) within x hours, or transactions performed in a variable zip code range within x hours. The variable zip range being the first four digits of the zip code. Geo-codes allow the system to telescope from a very broad parameter (i.e., continent) to a country, to a region or group of states (i.e., U.S.-North West) to a county, to a zip, to a census tract, to a block group, to a block. Events can be recalculated for files that come in late or with prior transaction dates. This allows transactions to be processed on a particular date without having to start over when additional files for that date arrive, the new transactions can be added and the events updated. The events are then scored by transactional attributes carried with the card and in view of other transactions in the particular event. Historical Look back is initiated for transactions with a indication of previous activity to determine if they fit the Pair-or-More criteria, described in greater detail below. Indicators are marked for number( or %) of transactions that fit the over $200 criteria.

Event Scoring Parameters are permanently carried with the event record unless it is updated by new transaction(s). Event Scoring Parameters may further include:

1. Number of cards_with dollar amount>=_;
2. High dollar card with more than one gas purchase;
3. High dollar card with more than one Jewelry purchase;
4. High dollar card with more than one Electronic purchase;
5. High dollar card with more than one Dept-store purchase;
6. High dollar card with more than use of (gas and/or Jewelry and/or Electronic and/or department store);
7. Number of cards_with uses>=_;
8. Number of cards>=_ in the 5 day.

A weighting table gives a value to each event characteristic marked during evaluation. The sum of the weights is the score for the event. The weighting table list all items to be scored and gives their weights these are reviewed and modified by the analyst before the run commences A Pair-Or-More (POM) same day will link cards in events to other events. There must be at least 2 or more cards in the event that link to another single event. POM connections include cards in an event that link another event. All 3 events may not have the same cards, but they are added into the same POM event because of their linkages. They are "rolled" together.

1. POM Same Merchant at least 2 events have the same cards and those cards were used at different merchants.
2. POM History this identifies events over the last 5 days that link together.

Figure 5:
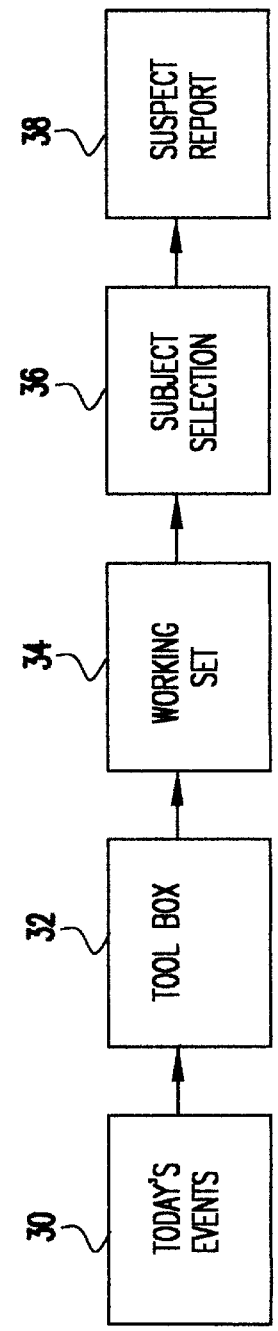
FIG. 5 is a flow diagram showing the routine for event analysis from the perpetrator's view.

Referring now to FIG. 5 there is shown a flow diagram according to the perpetrator's view. That is, events are analyzed or chained together to identify fraudulent patterns. Today's events 30 are analyzed by a set of tools 32 as outlined below to produce a working set for an analyst to determine a suspect selection list 36 from which a suspect report can be generated for the FI. The software tools may include a Geo-analysis tool which identifies suspicious clusters in a geographic region. A look back tool is used to select other events from the 5 day table and their associated transactions and then stores them in a table. A chaining tool allows an analyst to review the current days activity in light of historical activity over the last 5 days or other cases or POC's and assess the on-going nature and impact of today's work. For example, if a group of five cards are clustered and involved in an event, the chaining tool may look back over the past several days to see if those five cards, or any combination thereof were involved together in another event. In this other event, it may be discovered that not only these five cards were involved, but that three additional cards were also involved that, at the time didn't seem suspicious, but now does. In this manner, various events can be chained together to further identify fraudulent transactions that in and of themselves may appear benign. An index tool compares today's events to yesterdays or last week's average looking for significant statistical differences. The look back tool traces a card's history by identifying the events the card was involved in over the last 5 days and returns with any other card numbers that appeared in those events. The process can then be repeated with the newly identified cards until no new cards are returned. In this manner, the invention offers an accelerated method for identifying the relatively few suspect counterfeit card transactions from among the massive number of card transactions which occur on a daily basis.

While the invention has been described in terms of a single preferred embodiment, those skilled in the art will recognize that the invention can be practiced with modification within the spirit and scope of the appended claims.

We claim:

1. A computer-implemented system for detecting potential counterfeit financial cards, comprising:

a computer database comprising financial card transaction data reported from a plurality of financial institutions;

scoring means for assigning weights to individual transactions to identify suspicious transactions, the suspicious transactions and particular cards involved in the suspicious transactions being assigned a score;

means for categorizing said suspicious transactions into event groups based on a geographic region where said suspicious transactions occurred and a time when said suspicious transactions occurred;

event scoring means for scoring said event groups based on transaction scores and card scores in said event groups to identify financial cards involved in a suspicious transaction in a same geographic region during a common time period to identify a cluster of potential counterfeit financial cards.

2. A computer-implemented system for detecting potential counterfeit financial cards as recited in claim 1 wherein said common time period comprises one hour.

3. A computer-implemented system for detecting potential counterfeit financial cards as recited in claim 1 wherein said geographic region comprises one of a continent, a country, a region, a group of states, a county, a zip code, a census tract, a block group and a block.

4. A computer-implemented system for detecting potential counterfeit financial cards as recited in claim 1 wherein said geographic region comprises regions having same first digits of a zip code region.

5. A computer-implemented system for detecting potential counterfeit financial cards as recited in claim 1 wherein said suspicious transactions are determined by analyzing standard industrial codes (SICs) of entities where said transactions took place.

6. A computer-implemented system for detecting potential counterfeit financial cards as recited in claim 5 wherein said suspicious transactions are further determined a dollar amount involved and a transaction successful or transaction denied status.

7. A computer-implemented system for detecting potential counterfeit financial cards as recited in claim 1 wherein said financial cards are one of credit cards and debit cards.

8. A computer-implemented method for detecting probable counterfeit financial cards, comprising the steps of:

storing in a computer database financial card transaction data reported from a plurality of financial institutions, said data comprising a geographic region where individual transactions occurred and a time when said individual transactions occurred;

scoring individual transactions to identify suspicious transactions and scoring financial cards involved in said suspicious transactions;

categorizing said suspicious transactions into event groups based on a geographic region where said suspicious transactions occurred and a time when said suspicious transactions occurred; and scoring said event groups based on transaction scores and card scores in said event groups to identify financial cards involved in a suspicious transaction in a same geographic region during a common time period to identify a cluster of potential counterfeit financial cards.

9. A computer-implemented method for detecting probable counterfeit financial cards as recited in claim 8 wherein said time period comprises one hour.

10. A computer-implemented method for detecting probable counterfeit financial cards as recited in claim 8 wherein said geographic region comprises one of a continent, a country, a region, a group of states, a county, a zip code, a census tract, a block group and a block.

11. A computer-implemented method for detecting probable counterfeit financial cards as recited in claim 8 wherein said geographic region comprises regions having same first four digits of a zip code region.

12. A computer-implemented method for detecting probable counterfeit financial cards as recited in claim 8 wherein said suspicious transactions are determined by analyzing standard industrial codes (SICs) of entities where said transactions took place.

13. A computer-implemented method for detecting probable counterfeit financial cards as recited in claim 8 wherein said suspicious transactions are further determined a dollar amount involved and a transaction successful or transaction denied status.

14. A computer-implemented method for detecting probable counterfeit financial cards as recited in claim 8 further comprising the step of chaining together events by identifying clusters in different events containing common cards.

* * * * *